Figure 1:
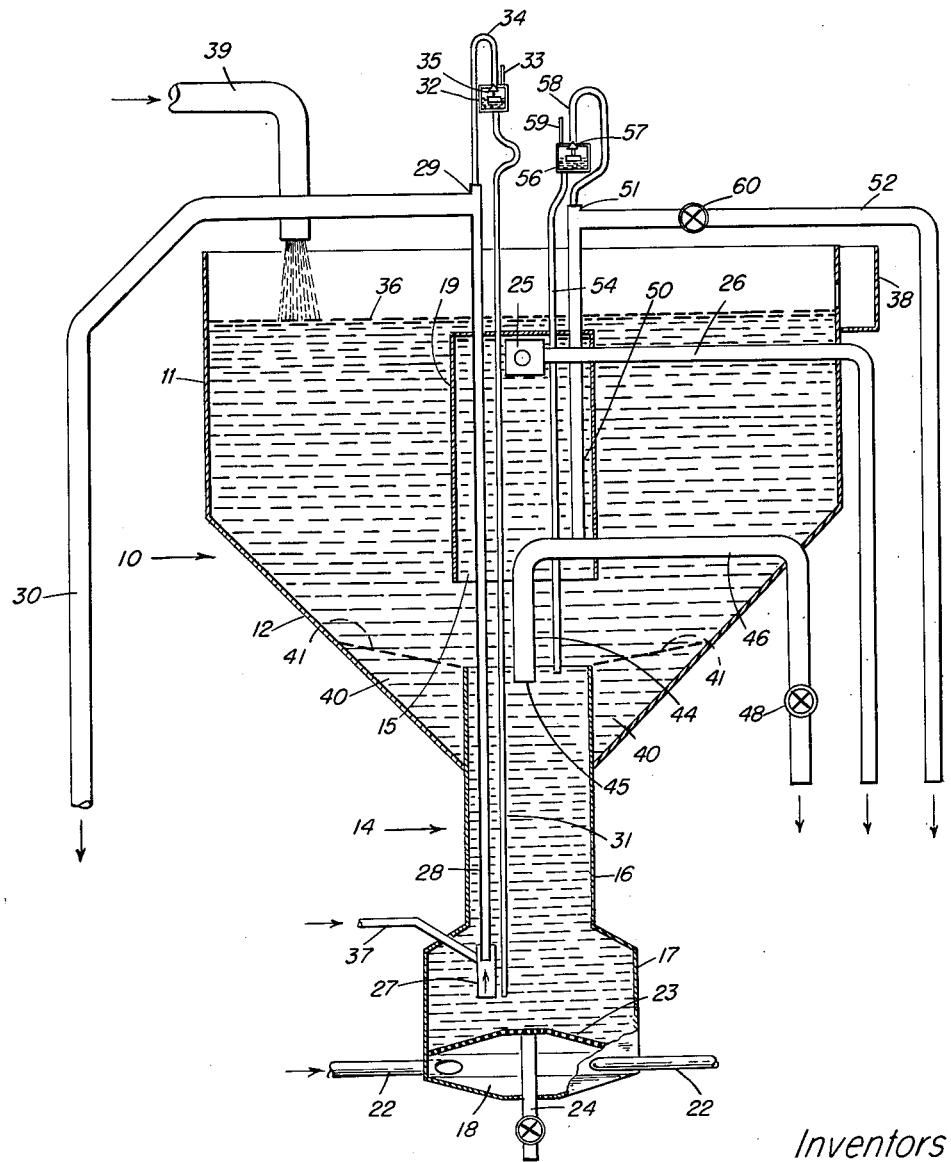

United States Patent Office 3,032,194
Patented May 1, 1962

3,032,194
HYDRAULIC CLASSIFICATION OF SOLIDS
Robert D. Evans, Pierce, and Harvie W. Breathitt, Jr., Lakeland, Fla., assignors to The American Agricultural Chemical Company, New York, N.Y., a corporation of Delaware
Filed Jan. 21, 1960, Ser. No. 3,887
11 Claims. (Cl. 209—158)

This invention relates to apparatus for the hydraulic classification of solids in divided form, and particularly to separation and product discharge instrumentalities in apparatus for hydraulically classifying or sizing solid particles which may be supplied in an aqueous pulp and which are to be classified according to settling rate, i.e. separated into a plurality of fractions having different characteristics of particle size or settling rate, each fraction being composed primarily of particles whose size or settling rate lies within a predetermined range.

In a more particular sense, the invention relates to instrumentalities for the segregation and discharge of a product of intermediate size or settling rate, or from an intermediate locality, in hydraulic classifying apparatus involving means for effectuating settling of particles in the supplied solids, including a lower hindered-settling column established by the addition of supplemental liquid, commonly called hydraulic water, flowing in a direction opposed to the direction of settling, and an upper free-settling column disposed above the hindered-settling column, communicating therewith and with the flow of supplied solid-bearing liquid, and having a continuous upward flow of water therein provided by the action of a siphon; especially apparatus of the character disclosed in United States Patent No. 2,708,517, granted May 17, 1955 on application of Robert D. Evans, further embodiment of such apparatus being disclosed in United States Patent No. 2,784,841, granted March 12, 1957, on application of Robert D. Evans.

As hereinafter more fully explained, the classifiers just mentioned, especially in the basic form disclosed in the first-cited patent, involve a column-defining structure providing an upper free-settling column and a lower hindered-settling column disposed in vertical spaced relation to each other and opening toward each other at a central region of the apparatus, with suitable means at the foot of the hindered-settling column for introducing supplemental liquid, e.g. hydraulic water, through a constriction plate or the like, to flow upwardly through the column, and siphon means at the upper end of the free-settling column to draw liquid upwardly through that column; a relatively large, upright cylindrical tank surrounds the upper column and the space between the columns.

In operation, the entire apparatus is filled with liquid. Feed pulp containing liquid to be classified is introduced into the tank at a location near the top of the tank, whence it passes downwardly into the region between the columns; the continuous upward flow of supplemental liquid in the lower column establishes a condition of teeter therein, for selective accumulation of coarse or faster-settling particles in the lower portion of the column, from which locality a product consisting primarily of such particles is withdrawn by appropriate discharge means opening at the foot of the column, while the siphon means in the upper, free-settling column effects the withdrawal of a substantial quantity of liquid carrying the fine or slower-settling particles. Any coarse particles drawn into the free-settling column by the siphon settle downwardly into the lower column before they reach the upper, withdrawal region of the free-settling column. A launder of appropriate design is provided at or near the top of the tank to collect the overflow from the tank and thereby to remove the finest particles or slimes which have the slowest settling rate and are carried by the overflow into the launder.

The apparatus, and the improved form thereof to which the present invention relates, are applicable to the classification of many varieties of particulate solids; one especially important example of their employment is the classification of mineral phosphate, e.g. phosphate ores or fractions thereof, consisting of phosphates in various quantities together with impurities, primarily siliceous gangue. In many cases, phosphate in commercially important quantities occurs principally or preponderantly in the larger or largest particles of such particulate ores; hence, one use of the apparatus has been as a primary treatment for phosphate ore, e.g. so-called phosphate rock. For instance, after preliminary removal of very coarse material, the phospate ore, in water, is delivered to the described apparatus, wherein the fraction obtained from the foot of the hindered-settling column is recovered as the desired product, comprising the faster-settling particles in which the phosphate predominates. The finer particles of the feed are removed as the other fraction, i.e. from the top of the upper or free-settling column.

For certain purposes, however, it has now been found desirable to segregate and withdraw a second fraction of size or settling-rate range intermediate between that of the coarse product withdrawn from the foot of the hindered settling column and that of the fine product or tailings withdrawn from the free-settling column. For instance, from certain types of mineral phosphate feed a product that is usually referred to as phosphatic sand and that heretofore would have been derived from the classifier tailings, could to advantage, be recovered directly as an intermediate fraction. This phosphatic sand, which is a particulate material comprising a high proportion of silica and a correspondingly low proportion of phosphate, is useful, e.g. as a carrier or filler in fertilizers that are otherwise agriculturally sufficient with respect to active ingredients such as available phosphate.

The withdrawal of an intermediate product by the present invention has also been found valuable in other circumstances of classifying mineral phosphate, as will be explained below, and likewise in the classification of other materials, such as ordinary sand. Thus for various purposes, as in the case of cement sand and in the situation of sand to be used in making abrasives, the improved apparatus affords a desirably greater number of product fractions or cuts, of mutually different particle size characteristics, than previously possible in a single operation with this type of equipment.

It has not heretofore been apparent that results of this sort could be obtained with the so-called double-column classifiers described above. As explained, they are adapted to handle a feed supplied as a relatively dilute aqueous pulp, and to accumulate a product of the coarse or faster-settling particles at the foot of the hindered-settling column, while delivering the remaining fraction, or tailing, of finer or slower settling particles through the discharge pipe from the top of the free-settling column. Larger particles that may start to rise in the upper column fall back to the region below, while in the lower column finer particles tend to be, in effect, rejected upwardly, since the teeter conditions there provide an increased fluid density that causes such finer particles to float and be carried up by the rising water. Under these circumstances it has not been manifest that there could be effective classication otherwise than into the two fractions described.

It is accordingly an object of the present invention to provide means for the discharge of a product of intermediate size or settling rate from hydraulic classifying apparatus of the stated type. Another object is to provide means for discharge of such a product whose range of size or setting rate will be relatively restricted. A further object of the invention is to afford means which by providing discharge of a product of intermediate size range from the aforementioned apparatus will promote attainment of a sharper cut or fractionation with respect to one or both of the other fractions, especially the product withdrawn from the foot of the hindered settling column.

A still further object is to provide means for discharge of a separate, supplemental fraction in the vicinity of the top of the hindered settling column, in automatic response to the pressure of the adjacent region of such column so as to permit discharge only when the pressure is at or above a predetermined value. Another object is to provide means for the segregation and discharge of particles of intermediate size or settling rate which are found in, and may be disposed in localities of teeter condition in, the hindered settling column, such particles thus being separated from descending coarse particles in the column.

To these and other ends, the invention essentially comprises a hydraulic classifier, for example of the type of the cited patents, including an upright cylindrical tank, a submerged upper column within the tank, and a lower column extending beneath the tank, together with supplemental structures for the removal of a product, e.g. of intermediate size or settling rate, from the upper region of the lower column. Specifically, such structure includes siphon means, having an opening at the upper end of the column disposed centrally with respect to the sides of the column, and extending outwardly therefrom through or above the tank wall to a suitable discharge locality. That is to say, it has been discovered that by so positioning the mouth of a siphon discharge conduit, a useful fraction of particles of an intermediate size range can be recovered. At this locality, i.e. the uppermost region of the hindered settling column, such particles have been found to be present, presumably by the hindered settling effect, whereas at lower points the coarser particles (which are to accumulate at the foot) are in too large a proportion across the column. A particularly important finding is with respect to the central disposition of the opening of the discharge conduit, viz. at about the center of the top of the column: it appears that the larger or faster-settling particles of the feed tend to settle downward around the periphery, i.e. near the wall of the cylindrical column, as they reach such region from the surrounding main tank. Hence an unusual selectivity for the particles of intermediate size or settling rate is achieved by placing the siphon discharge at the center of this area.

Control of the flow through the intermediate siphon may be effected manually, or, since it has been found that in many cases the condition of teeter extends to the upper end of the hindered-settling column, and thus that the pressure at the level of the siphon opening is greater than the normal fluid pressure or head of water would be at such level, a float valve responsive to hydrostatic pressure may be arranged for automatic control, e.g. a valve of the type disclosed in United States Patent No. 2,714,958 granted August 9, 1955 on application of Robert D. Evans. For such purpose the siphon conduit extends up to and down from a locality above the uppermost level of liquid in the main tank of the classifier, and the float valve is adapted to close or open a passage between the conduit at said locality, and the atmosphere.

In particular, a float valve of this type is so disposed on a hydrostatic column extending upwardly from the level of the siphon opening that when the pressure at that level reaches a predetermined value, corresponding to a given density of the liquid suspension of particles in teeter, the rising liquid in the hydrostatic column closes the float valve, sealing the siphon from the atmosphere and permitting discharge of liquid carrying particles through the siphon. This float valve may thus be positioned to effectuate discharge of particles of a desired intermediate size or settling rate. In some circumstances this siphon with automatic control (as by the float valve) may serve in aid of the withdrawal means at the foot of the hindered-settling column; thus if coarse particles tend to accumulate sometimes to a sufficient density in the upper region of the hindered-settling column, the intermediate siphon control may be set to permit discharge of these particles and thereby relieve an undesirably excessive accumulation of them.

Combinations of these devices are particularly useful: a manually controlled siphon conduit for discharge of a product of intermediate size or seettling rate, having its horizontal portion sufficiently far beneath the surface of liquid in the apparatus so as not to be affected by an opening to the air, may have a branch or alternative discharge conduit section which extends through a locality above the surface of liquid and is arranged with a float-valve control as described above. Apparatus so constructed may be variously used; for instance, if the float valve is normally open so that the conduit section it controls is only effective under certain unusual conditions, the lower discharge section may be employed (under manual control) for withdrawal of an intermediate product, e.g. of phosphatic sand, at desired times.

A further embodiment of the invention comprises the aforementioned siphon means in combination with a hollow cylinder, open at each end, having a smaller diameter than that of the hindered-settling column and disposed co-axially within the column and extending above the upper end of the column, so as to surround the siphon opening. This cylinder acts as a guard or partition defining the region where particles of intermediate size or settling rate are to be withdrawn, i.e. separating this region from the peripheral region of the column where the coarser particles predominate in settling downwardly, and thus preventing diffusion of such coarser particles into the central region and enhancing the classifying action as to the intermediate particles.

Indeed the described inner partition in effect defines or provides a supplemental hindered-settling column, which has its wall elevated in relation to the wall of the outer or main column so that in general, coarse particles will not enter the inner region from the top. Thus the inner teeter column can be considered as functioning to accumulate particles of intermediate size range. Any or all of the above-mentioned siphon control mechanisms may be employed in combination with this structure.

Figure 2:
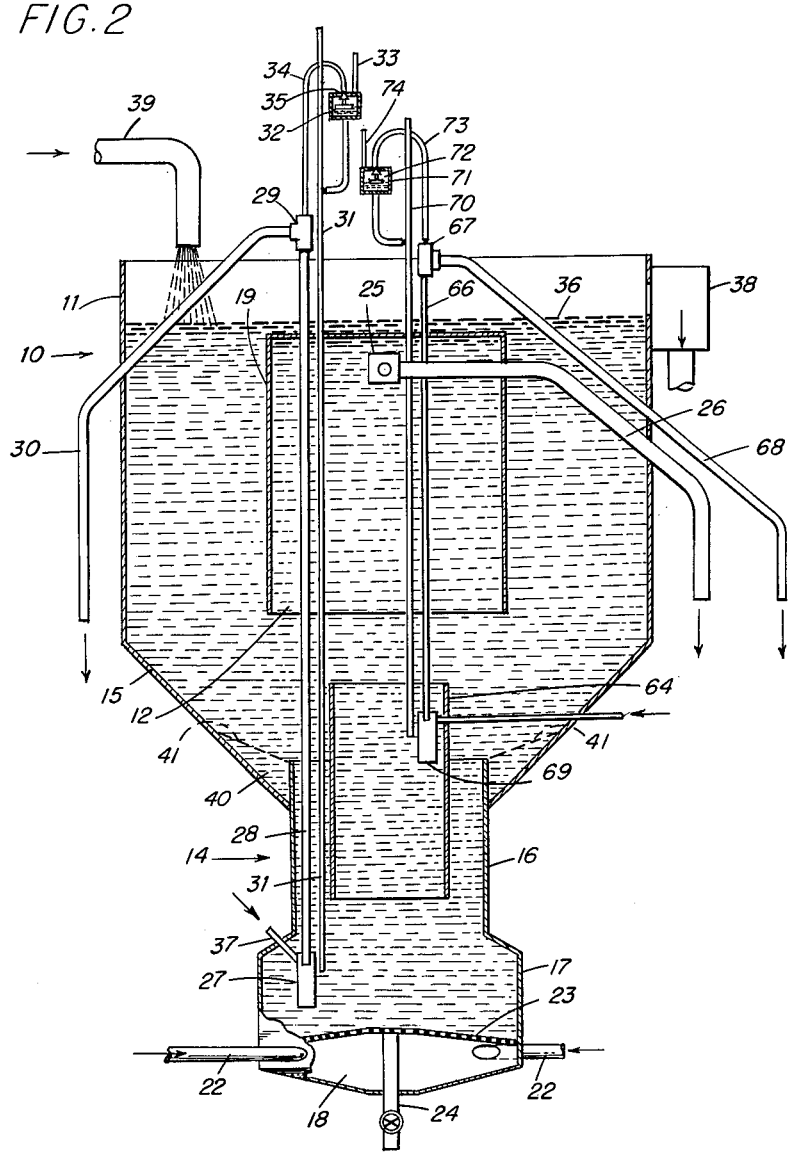

The construction and operation of the invention are set forth in fuller detail hereinbelow, in connection with the drawings, wherein:

FIG. 1 is a somewhat schematic view of one embodiment of the invention, illustrating the apparatus as if in vertical cross-section; and FIG. 2 is a view similar to FIG. 1, but schematically illustrating a second embodiment of the invention.

The classifier of FIG. 1 is essentially of the stated Evans type, somewhat simplified for purposes of illustration. It comprises a main tank, generally designated 10, having an upper cylindrical portion 11 and a lower frusto-conical portion 12 tapering downwardly from the cylindrical portion to meet a lower hindered-settling column 14, which consists of a cylindrical portion 16 extending upwardly into the frusto-conical portion 12 of the tank and downwardly for some distance therefrom, and a lower cylindrical pocket 17 of somewhat greater diameter than the portion 16. Within the tank 10, and coaxial with it, is an inverted cylindrical tank or vessel 19, constituting the upper or free-settling column in the classifier, mounted by appropriate means (not shown), and having a closed upper end and a lower open mouth 15 spaced desirably above the cylindrical portion 16; the diameter of the tank 19 is preferably at least as great or greater than that of the portion 16 of the hindered-settling column.

At a lower region in the cylindrical pocket 17 of the hindered-settling column, means are provided for the continuous introduction of water in considerable quantity, e.g. a plurality of pipes 22 introducing such water substantially tangentially to the sides of the pocket. Within the pocket, immediately above the locality of introduction of water, is a so-called constriction plate 23 separating the lower region 18 at the pocket from the upper region thereof; this plate has multiple perforations of suitable size, through which the water introduced by pipes 22 flows with considerable velocity, to rise in the column 14 and provide hindered-settling conditions therein. For purposes of drainage at desired times, a valved pipe 24 (normally closed) extends downwardly from the constriction plate 23 to a region below the pocket 17.

To provide a discharge at the top of the upper column 19, a short pipe length 25 (with its axis vertical), having a plurality of side openings for entrance of liquid, is mounted directly beneath the closed upper end of the column. From this inlet device 25 a siphon-type discharge pipe 26 extends to a convenient discharge locality (not shown) outside the tank 10, for removal of liquid rising in the upper column 19.

Another discharge instrumentality opens within the hindered-settling column pocket 17, above the constriction plate 23. Although this discharge means may be of various designs, a presently preferred form, as illustrated, comprises a float-valve controlled siphon system, of the type disclosed in Evans U.S. Patent No. 2,714,958. It includes an enlarged lower section 27, opening downwardly and connected at its upper end with a long pipe section 28 extending upwardly to a predetermined location above the tank, where it communicates, e.g. through a T-fitting 29, with a further pipe section 30 extending horizontally beyond the tank and thence downwardly to a suitable discharge location (not shown).

Opening downwardly in the pocket 17 at about the level of the opening of the siphon section 27, a pipe section 31, providing a hydrostatic column, extends upward and communicates at its upper end with a float valve chamber 32 located a predetermined distance above the tank 10 and above the horizontal portion of the pipe 30. The chamber 32 at its top communicates with the atmosphere through a vent 33, and also with an air vent tube 34 which opens into the siphon conduit system 27—30 at the T-fitting 29. Within the chamber is a valve float element 35 which is adapted, on floating upward, to close the air vent tube 34.

This float valve is so positioned in relation to the surface 36 of liquid in the tank 10 that it will close when the pressure in the locality of the lower opening of the pipe 31 is greater than normal liquid pressure at that region by a predetermined amount, representative of a certain particle density in that locality; i.e. when liquid rises, due to the artificially increased fluid density caused by the condition of teeter in the pocket 17, to a predetermined level in the hydrostatic column above the level 36 of fluid in the tank 10, the valve, which is positioned at that predetermined level, closes, thereby sealing the siphon pipes 28, 30 from the atmosphere and permitting siphon action to effect discharge of particle-bearing liquid from the pocket 17. A supplemental flow of water is introduced into the lower siphon section 27 through a priming pipe 37 to facilitate the initiation of this siphon action.

A launder 38 is disposed at an appropriate locality in the upper region of the tank 10, accessible to the interior of the tank at a locality above the top of the column 19, for collection and removal of overflow from the tank 10. Suitable means for introduction of a feed pulp, e.g. a pipe 39, open into or above the tank 10 at an upper region thereof.

The above-described structure is basically that of the classifier disclosed in Evans Patent No. 2,708,517, from which it will be understood that in operation the apparatus is kept filled with liquid to a level above the closed top of the free-settling column 19. Pulp containing particles to be classified is introduced, e.g. through feed pipe 39, at the uppermost region of the tank 10; the finest particles or slimes are carried away by the overflow into the launder 38, and the remainder of the particles travel downwardly in the tank, moving inwardly at the tapered region 12, to the locality between the upper free-settling column and the lower hindered-settling column. In the initial stages of operation with the construction here shown, settling particles tend to collect in the annular space 40 defined by the upper extension of the portion 16 of the lower column and the lower part of the tapered tank section 12, building up a deposit of solid material to a surface or level such as designated by the dotted line 41. This accumulated deposit is advantageous in protecting the metal tank wall from erosion which might otherwise result from particles being swept across it toward the region between the columns 19, 14.

At the region last mentioned, the particles of the feed pulp come under the influence of the two columns, functioning as described above. Thus as solids accumulate in the lower column 14, the action of the supplemental or hydraulic water introduced at the foot through the constriction plate 23 is to build up a condition of teeter in the mass of particles, producing in effect a higher fluid density, and establishing hindered settling in the column. Hence essentially only the larger or faster-settling particles can travel down to the lower part of the column, for withdrawal through the siphon 27—30, the float valve 35 having closed the vent tube 34 in consequence of the increased hydrostatic pressure resulting from the higher fluid density just mentioned. The finer or slower-settling particles, unable to descend in the column 14, are carried upward by the flow, into the upper column 19 and thence through the discharge means 25—26 to constitute the finer fraction or tailings. Larger particles that may be initially entrained in the upward flow settle freely downward in the column 19, and thence into the lower column 14, eventually to become part of the coarse fraction withdrawn from the latter. These operations, providing two sized fractions, constitute the function of the classifier as heretofore designed, i.e. without the present improvements.

In accordance with the invention, a siphon-type discharge means 44 is disposed to have a downward opening 45 in an upper part of the lower column 14. Although this locality is adjacent and freely open to the region between columns, into which the feed of particles of all sizes must flow, it has been discovered that by providing the discharge means 44 within the top of the lower column and especially by disposing the opening 45 at the center of the column, i.e. inwardly remote from the wall 16, a solids fraction of significantly intermediate particle size range may be withdrawn. As explained hereinabove, particles of such size have been found to accumulate at this locality, presumably by reason of the hindered settling effect, and whereas in the course of time they might otherwise migrate upward to pass out through the free-settling column, or in part move downwardly to the foot of the lower column, they can be effectively discharged, as a separate fraction, through the pipe 44 or like means.

It has also been noted above that the largest or fastest settling particles of the feed tend primarily to descend adjacent the periphery or wall in the lower column, i.e. as soon as they reach the region between columns, from the outer parts of the tank 10. In consequence, the central region of the lower column is relatively free of the largest particles (in its upper part), while the finest particles tend to be swept promptly upward into the column 19. It is believed that the results obtained with the discharge means 44, in collecting a fraction of intermediate size or settling characteristics, are at least in part occasioned by the extension of hindered settling, i.e. teeter conditions, essentially all the way to the top or near the top of the column 16; observation tends to confirm this belief, and in any event, ample test has demonstrated the effectiveness of the supplemental discharge means for the described purpose.

As exemplified in FIG. 1, the discharge 44 may extend upward from the opening 45 to and through a horizontal pipe section 46, located substantially below the level 36 of liquid in the tank 11, and then downwardly to a suitable discharge location (not specifically shown) outside the tank. The flow of pulp through the means 44—46 can be manually shut off or controlled by a valve 48.

With hindered settling conditions prevailing in the region around the supplemental discharge opening 45, such discharge may have an automatic siphon control, for example of the character embodied with the discharge system 27—30 for the largest particles. Means appropriate for such automatic control are also shown in FIG. 1, thus providing apparatus in which either type of operation may be employed, as circumstances may dictate. Thus from the pipe system 44, 46, a supplemental siphon conduit 50 extends upward to a T-fitting 51 at a place above the liquid level 36, and thence outwardly and downwardly through a further siphon conduit 52 to a suitable, lower discharge location, again not specifically shown. A static tube 54, opening at its lower end adjacent the discharge opening 45, extends up to a float valve chamber 56, where the liquid carries a float valve 57 adapted to close an air vent tube 58 communicating with the T-fitting 51.

The operation is exactly as explained above for the valve 35 in the chamber 33. Thus when the fluid density adjacent the discharge opening 45 reaches a predetermined value (corresponding to a vertically adjusted setting of the valve chamber 56) the valve 57 closes the tube 58, interrupting communication between the siphon section 50—52 and the atmosphere through the further vent tube 59 of the chamber 56. It will be understood that the valve 48 is closed when this automatic siphon is to be used, so that no discharge takes place through the system 45—46. With the air opening in the T-fitting 51 closed by the valve 57, siphon flow is initiated and continues through the pipe system 44, 50, 52, being interrupted when and if the density of liquid around the hydrostatic tube 54 drops below the desired value. In general, the position of the chamber 56 is below that of the chamber 32, inasmuch as the density at the upper end of the hindered settling column will generally be lower than at the bottom end, and the control point for initiation of siphon flow will be desired at a lower value of hydrostatic pressure.

Thus the illustrated apparatus may be arranged, as shown, to provide automatic control of pulp discharge into the opening 45, at a selected condition or density of particles in teeter at this region. Under some circumstances it may be desired to utilize only manual control, in which case the valve 48 is appropriately opened, and a supplemental valve 60 in the automatically controllable siphon line 52 can be closed. It will be understood that while the apparatus shown is thus capable of alternate types of control of the intermediate discharge, with the valves 48, 60 alternatively opened and closed, the equipment may usefully be built and operated with only one, i.e. either one, of these types of siphon discharge, omitting the other.

By way of example, some types of classifying operation may require continuous withdrawal of the intermediate product, regardless of variation in density or pressure conditions at the head of the hindered settling column; in such case the manually-controlled system 44, 46, 48 suffices and is used. In other situations, automatic control with the aid of the float 57 and the upwardly extending siphon system 44, 50, 52 may be required for more precise regulation of the fraction of intermediate particle size. Thus variations in the amount or particle size distribution of the feed may be such that suitable accumulation of such fraction is only obtained at certain times.

A still further use of the automatic siphon for discharge from the pipe opening 45 is in aid of procedure whereby only the basic two products are sought, being the fraction of large particle size at the foot of the column 14 and particles of small size at the top of the column 19. If in such operation the feed volume may sometimes very greatly increase, thus building up the coarse or fastest settling particles in the column 14 at a greater rate than they can be withdrawn at the lower end, the supplemental means 45, 50, 52 may serve as an auxiliary or emergency discharge for such pulp. To that end, the float chamber 56 is so set, e.g. at an appropriately high position, as to permit automatic function of the supplemental siphon for removing the overload, so to speak, of fastest settling solids when such overload exists.

In FIG. 2 another embodiment of means for withdrawing a supplemental flow of particles in liquid, as in the nature of an intermediate fraction, is illustrated. For convenience, it may be understood that the basic elements of the classifier are precisely or substantially the same as those illustrated in FIG. 1, and therefore need not be described again, such parts being the main tank 10, the lower column 14, the upper column 19, the discharge means 27—30 and 25—26 for the principal coarse and fine fractions, and the several feed supply, water supply, control, overflow and like instrumentalities above identified in FIG. 1 and therefore similarly numbered in FIG. 2.

In this embodiment, there is included further structure which provides positive lateral definition of the region from which the supplemental discharge means withdraws liquid containing particles of intermediate size range or the like. Such structure comprises a hollow cylinder 64 disposed coaxially within an upper part of the lower column 14. A specifically advantageous arrangement is the provision of such cylinder 64 extending downwardly for some distance into the settling column cylinder 16, e.g. to or preferably a little below the middle level of the latter, and also extending upwardly for some distance above the mouth of the cylinder 16 (at the bed level 41), for instance so as to project to about a central level of the region between the upper and lower columns, as shown.

The cylinder 64 thus defines an inner column of significant size, for instance having a diameter between one-half and three-fourths that of the column portion 16 and having an overall length comparable to that of such portion. This separately enclosed region, for which withdrawal means is provided as described below, not only affords significant isolation of its interior from the largest or fastest settling particles which primarily descend around the wall of the column 16, thus aiding to concentrate them there and inhibiting their substantial contamination of the pulp within this cylinder 64, but also is capable of consituting, in effect, a supplemental hindered settling column, i.e. where particles of intermediate size range or settling characteristics tend to accumulate in teeter under influence of water rising from the pipes 22.

Suitable discharge means are provided for the interior of the inner column 64, such as either of the two systems indicated at 44—46 and 44—50—52 of FIG. 1. With this column functioning by hindered settling, special effectiveness is achieved by using the second type of system, i.e. an automatically controlled siphon device. Thus a siphon system comprising the vertical pipe 66 rising to a T-fitting 67 above the liquid level 36 in the main tank 10 and a further, outwardly extending pipe 68 directed to discharge at a suitable external locality, is shown in FIG. 2, the inlet of the pipe 66 being constituted by a suitable bell 69 opening downwardly within the cylinder 64. Although the opening of the bell 69 may sometimes be disposed at lower levels in the cylinder 64 which provides an inner column tending to isolate the intermediate size particles and to accumulate them by hindered settling, superior results appear to be obtained by disposing the opening of the discharge device 69 in the upper half of this inner column, e.g. as shown. Since the cylinder 64 itself provides the function of central location as to separation of the intermediate size particles from the fastest settling solids, the inlet of the siphon system 69, 66 need not be placed at the center of the cylinder in a lateral direction, as in the case of the siphon opening 45 with respect to the lower column section 16 of FIG. 1.

This siphon means in FIG. 2 may also include a vertical static tube 70 rising from a locality near the bell 69 to a float chamber 71, wherein a float valve 72 is adapted to close a vent tube 73 that opens into the T-fitting 67 and that affords communication of the latter with the atmosphere, when the valve is open, through the further vent tube 74 of the float chamber 71. If desired, priming water for the siphon may be supplied to the bell 69 through a pipe 76, similar to the pipe 37 for the bell 27. It will be understood that the siphon control, with the described instrumentalities, functions in the same way as the other automatically controlled siphons described above, i.e. so as to initiate discharge when, and to maintain such discharge so long as, the pulp density in the column 64 has a predetermined value, affording corresponding hydrostatic pressure (at the selected control point) in the tube 70.

In the arrangement of FIG. 2, the inner cylinder 64 with its siphon discharge will be seen to constitute means in an upper part of the main lower column 14, at a central locality thereof, for withdrawing a pulp of particles which is classified, as in a range of smaller sizes, relative to the larger or faster settling particles that begin their descent of the lower column in regions adjacent its wall.

Specifically in FIG. 2 as feed is supplied through the pipe 39 and as various conditions of settling are established, the fastest settling particles accumulate in the lower pocket 17 for withdrawal through the siphon 27—30, while the smallest or slowest settling particles that reach the space between the lower column 14 and the upper column 19 are drawn off in suspension at the top of the latter through the means 25—26. The coarsest or fastest settling solids very predominantly fall around the outside of the inner cylinder 64, so that the interior of the latter receives, from what is essentially the sorting zone above it, the intermediate size particles. Augmented by particles of this category which may have reached the lower part of the column 14 and then been rejected upwardly, an accumulation of such particles is attained, in teeter, in the cylinder 64. Hence the fraction there withdrawn through the siphon 69, 66, represents the portion of feed pulp which it is desired to separate from the other fractions. Because of the hindered settling conditions in the column 64, any very small or slow settling particles which may get there, tend to be rejected upwardly for removal, as desired, by the upper column 19.

The operation of the systems shown in FIGS. 1 and 2 should be readily understood from the foregoing description. In all cases the feed of aqueous pulp to be treated is supplied at the top of the tank 10, from the pipe 39 or otherwise, while the so-called hydraulic water to effectuate hindered settling in the lower column 14 is supplied through pipes 22. The apparatus being kept full of liquid, the classifying action on the particles of feed proceeds in the described manner. All particles except extreme fines or slimes that overflow at the top of the tank 10, descend to the sorting zone between the columns 19, 14. The fastest-settling particles, i.e. usually the coarsest, accumulate toward and at the foot of the hindered-settling column 14 and are removed by the siphon 27—30, while the slowest-settling or finest particles tend to be carried up the column 19, for discharge through the pipe 26; in the manner explained hereinabove, an intermediate fraction is withdrawn at the pipe opening 45 (in FIG. 1) or as it accumulates in teeter in the inner column 64 (FIG. 2).

By way of example of the process for classifying mineral phosphate material, phosphate ore from which most of the particles larger than 14 mesh have been removed (as in so-called washer operation of conventional sort), can be supplied as feed to the tank 10 of FIG. 1, i.e. in the form of aqueous pulp of convenient dilution; inasmuch as factors of solids concentrations, amounts of water in various supplies and the like may be selected in the same manner as for previous double-column classifiers, and as the apparatus readily accommodates itself to large feed variations (e.g. in solids content and volume) also in the same manner, these aspects of the operation will be fully understood and need no special comment. In one set of tests with mineral phosphate feed as described above, classifying action without the supplemental discharge of the present invention yielded a product (in siphon 27—30) which graded 49.7% B.P.L. and of which 12.7% (dry weight) was +14 mesh, 57% was +28 mesh and 82% was +35 mesh, all being totals. The tailing (pipe 26) graded 13.4% B.P.L., and had size characteristics of 7.1% +35 mesh and 25.8% +48 mesh (total). When the additional siphon 44—46 was employed at an upper part of the lower column, the intermediate product there withdrawn graded 38.1% B.P.L. and contained 5.7% +14 mesh, 35% +28 mesh and 64.5% +35 mesh. The coarse product then actually increased in grade, to 51.1% B.P.L., with a slight increase in coarse particle content, 17.8% +14 mesh and 59.7% +28 mesh, while the tailing went down to 11.2% B.P.L. and only 19.5% +48 mesh.

It will be seen that an additional product of valuable phosphate content was thus obtained, reducing the amount of phosphate lost in the tailing; although the quantity of coarse product was somewhat reduced (say, by one-eighth), its grade was improved, and taking the intermediate product into account, the over-all operation was of significant advantage in point of useful phosphate recovery. For further concentration of phosphate, the intermediate product is appropriate for flotation or belt treatment, and the coarse product is likewise suitable for belt concentration, and also for tabling.

Under other circumstances, a cut of so-called phosphatic sand can be obtained with the middle siphon. For example, in the tests described above the opening 45 of this siphon was actually situated somewhat below the mouth of the lower column (e.g. by about one-third of the height of section 16); by raising the siphon to the position actually shown in FIG. 1, a product having about 20% to 25% B.P.L. is obtained, still of intermediate particle size characteristics, and representing a material which can be used or sold as phosphatic sand. It will be understood that in operations with or without the siphon 44—46, the phosphate-poor tailing from the pipe 26 is not directly suitable, for this purpose, especially because of its high content of very fine particles. In operations appropriate for withdrawal of phosphatic sand from the supplemental siphon, a convenient procedure is to open or close this pipe with the manual control valve 48, i.e. so that such fraction is discharged only when needed and only when available without unwanted decrease in the yield of coarse product.

The special arrangement of FIG. 2 is of particular advantage in providing a plurality of fractions valuable for phosphate content. Thus with a suitable phosphate ore feed, e.g. including all particle sizes ranging from three-fourths inch to the fine sizes, useful products may be obtained, in appropriate cases, from the top of the free-settling column, from the discharge 66—68 of the inner teeter column and from the lower region 17 of the main teeter column, adapted respectively for further concentration by flotation, tabling and belt operations. Alternatively, as in cases similar to the example first described above, as with feed chiefly —14 mesh, very useful intermediate and coarse fractions may be obtained with the system of FIG. 2; these can be further treated to concentrate phosphate, as has also been explained above.

Other materials, e.g. other mineral substances, can be usefully classified by the present improvements. For instance, ordinary sand (i.e. silica sand to be used in construction materials) is effectively graded in size with double-column apparatus of the basic type shown in the drawings, and by employing an intermediate, automatically controlled siphon discharge as indicated at 44—51—52 in FIG. 1, three size grades are obtainable, viz. a fine material as plaster sand, an intermediate product suitable for concrete blocks, and a coarser sand useful for road construction.

As will be appreciated, the apparatus can vary widely in size and capacity, in accordance with requirements. Merely as an example, one useful classifier had an outer cylindrical tank portion 11 with a diameter of 15 feet, a cylindrical upper column 19 with a diameter of 6 feet, and a cylindrical teeter column portion 16 having a diameter of 4 feet and a total height of 7 feet, projecting 2 feet above the bottom of the cone 12. The lower, enlarged pocket section 17 had a height of about 3 feet above the plate 23. The various siphon discharges were constituted by pipes of suitable size; for instance, effective results were had with a manually controlled siphon pipe 44—46 of 4 inches inside diameter.

It is to be understood that the invention is not limited to the specific forms herein shown and described but may be carried out in other ways without departure from its spirit.

We claim:

1. Hydraulic classifying apparatus for classifying a feed of solid particles having a range of sizes, into three fractions in accordance with settling characteristics, comprising a vessel adapted to be filled with liquid, for receiving the aforesaid feed of solid particles, upright lower column means opening upwardly into communication with a lower part of said vessel and having liquid-introducing means and pulp removing means at the foot thereof, for effectuating hindered settling in liquid-carried particles contained in said column means, to accumulate particles of fastest-settling characteristics for discharge through said removing means, upwardly closed upper column means having removal means at the top thereof and disposed above the lower column means and opening downwardly into communication with said vessel at a locality spaced above the lower column means, for effectuating free settling of faster-settling particles in solids-carrying liquid moving upwardly in said upper column means, to separate and discharge particles of slowest-settling characteristics, in liquid, through said last-mentioned removal means, said vessel being constructed and arranged for supplying the feed particles to be classified into the space between the upper and lower column means at a laterally peripheral region of said space, and means disposed at the top of said lower column means, located centrally with respect to and of smaller diameter than the cross-section of said lower column, for collecting particles of intermediate settling characteristics while permitting fastest-settling particles to descend through the peripheral portion of said lower column means, said collecting means comprising means extending from said locality for withdrawing a pulp of said intermediate-settling particles.

2. Hydraulic classifying apparatus for classifying a feed of solid particles having a range of sizes, into three fractions in accordance with settling characteristics, comprising a vessel adapted to be filled with liquid, for receiving the aforesaid feed of solid particles, upright lower column means opening upwardly into communication with a lower part of said vessel and having liquid-introducing means and pulp-removing means at the foot thereof, for effectuating hindered settling in liquid-carried particles contained in said column means, to accumulate particles of fastest-settling characteristics for discharge through said removing means, upwardly closed upper column means having removal means at the top thereof and disposed above the lower column means and opening downwardly into communication with said vesesl at a locality spaced above the lower column means, for effectuating free settling of faster-settling particles in solids-carrying liquid moving upwardly in said upper column means, to separate and discharge particles of slowest-settling characteristics, in liquid, through said last-mentioned removal means, said vessel being constructed and arranged for supplying the feed particles to be classified into the space between the upper and lower column means at a laterally peripheral region of said space, and means disposed in an upper locality of said lower column means, spaced inwardly of the peripheral portion thereof which is below the aforesaid peripheral region, for collecting particles of intermediate-settling characteristics while permitting fastest-settling particles to descend in said lower column means, said collecting means comprising a column-defining structure spaced inwardly from the periphery of the lower column means and opening upwardly to the space between the upper and lower column means and downwardly at an intermediate level of the lower column means, for effectuating hindered settling to accumulate intermediate-settling particles in said column-defining structure, and means for withdrawing a pulp of intermediate-settling particles comprising a discharge tube opening into the interior of said column-defining structure.

3. Hydraulic classifying apparatus as defined in claim 2, which includes means including fluid density-sensitive means extending into the aforesaid column-defining structure adjacent the discharge tube, for controlling flow through said discharge tube to permit such flow of pulp only when the solids-carrying liquid in the column-defining structure has at least a predetermined fluid density.

4. Hydraulic classifying apparatus as defined in claim 1, wherein the particle-collecting means disposed in an upper locality of the lower column means comprises a siphon tube which opens into said lower column means at the top thereof and extends therefrom to a discharge locality, and which constitutes the means for withdrawing the pulp of intermediate-settling particles.

5. Hydraulic classifying apparatus for classifying a feed of solid particles having a range of sizes, into three fractions in accordance with settling characteristics, comprising a main tank adapted to be filled with liquid, for receiving the aforesaid feed of solid particles, upright lower column means opening upwardly into a lower part of said tank and having liquid-introducing means and pulp removing means at the foot thereof, for effectuating hindered settling in liquid-carried particles contained in said column means, to accumulate particles of fastest-settling characteristics for discharge through said removing means, upwardly closed upper column means having removal means at the top thereof and disposed within the main tank and opening downwardly therein at a locality spaced above the lower column means, for effectuating free settling of faster-settling particles in solids-carrying liquid moving upwardly in said upper column means, to separate and discharge particles of slowest-settling characteristics, in liquid, through said last-mentioned removal means, said tank being constructed and arranged for supplying the feed particles to be classified into the space between the upper and lower column means from the lateral periphery of said space, and removal means opening into the top of said lower column means at a locality disposed centrally of the horizontal cross-section of said lower column means, for withdrawal of pulp of particles having intermediate-settling characteristics while permitting fastest-settling particles to descend into said lower column means at peripheral regions of said lower column means.

6. Hydraulic classifying apparatus as defined in claim 5, wherein the removal means at the upper part of the lower column means comprises a discharge tube opening downwardly at the top of said lower column means, centrally thereof, for upward withdrawal of said pulp of intermediate-settling particles.

7. Hydraulic classifying apparatus as defined in claim 6, which includes means including fluid density-sensitive means extending to the top of the lower column means adjacent the discharge tube, for controlling flow through said discharge tube to permit such flow of pulp only when the solids-carrying liquid in the column-defining structure has at least a predetermined fluid density.

8. Hydraulic classifying apparatus for classifying a feed of solid particles having a range of sizes, into three fractions in accordance with settling characteristics, comprising a main tank adapted to be filled with liquid, for receiving the aforesaid feed of solid particles, upright lower column means opening upwardly into a lower part of said tank and having liquid-introducing means and pulp-removing means at the foot thereof, for effectuating hindered settling in liquid-carried particles contained in said column means, to accumulate particles of fastest-settling characteristics for discharge through said removing means, upwardly closed upper column means having removal means at the top thereof and disposed within the main tank and opening downwardly therein at a locality spaced above the lower column means, for effectuating free settling of faster-settling particles in solids-carrying liquid moving upwardly in said upper column means, to separate and discharge particles of slowest-settling characteristics, in liquid, through said last-mentioned removal means, said tank being constructed and arranged for supplying the feed particles to be classified into the space between the upper and lower column means from the lateral periphery of said space, and removal means opening into an upper part of said lower column means at a locality disposed centrally of the horizontal cross-section of said lower column means, for withdrawal of pulp of particles having intermediate-settling characteristics while permittng fastest-settlng particles to descend into said lower column means at peripheral regions of said lower column means, said removal means comprising a column-defining structure open at its top and bottom and disposed within said lower column means in inwardly spaced relation, for effectuating hindered settling to accumulate the intermediate-settling particles, and a siphon tube extending from the interior of said column-defining structure to a locality outside the main tank, for discharge of the aforesaid pulp of said intermediate-settling particles.

9. A hydraulic classifying apparatus for classifying a feed of solid particles having a range of sizes, into three fractions in accordance with settling characteristics, comprsing a main tank adapted to be filled with liquid, for receiving the aforesaid feed of solid particles, upright lower column means opening upwardly into a lower part of said tank and having liquid-introducing means and pulp removing means at the foot thereof, for effectuating hindered settling in liquid-carried particles contained in said column means, to accumulate particles of fastest-settling characteristics for discharge through said removing means, upwardly closed upper column means having removal means at the top thereof and disposed within the main tank and opening downwardly therein at a locality spaced above the lower column means, for effectuating free settling of faster-settling particles in solids-carrying liquid moving upwardly in said upper column means, to separate and discharge particles of slowest-settling characteristics, in liquid, through said last-mentioned removal means, said main tank comprising a lower conical portion surrounding the space between the upper ad lower column means and arranged for descent of the feed particles to be classified into said lower conical portion and for supplying said feed particles laterally into said space, and removal means opening into an upper part of said lower column means disposed centrally for the horizontal cross-section of said lower column means at the top thereof, for withdrawal of pulp of particles having intermediate-settling characteristics while permitting fastest-settling particles to descend into said lower column means outside of said segregating means.

10. Hydraulic classifying apparatus as defined in claim 9, wherein the removal means comprises siphon tube structure opening downwardly into the lower column means at the center of the top thereof, said removal means comprising further structure of said siphon tube extending to a discharge locality outside the main tank.

11. Procedure for settling rate classification of solid particles supplied in aqueous pulp, comprising: establishing a lower vertical column of aqueous liquid confined by vertical boundaries for receiving particles from the supply thereof, while introducing and advancing liquid upwards in said lower column from lower localities thereof, to provide hindered settling in said column for selective accumulation at the foot thereof of particles of fastest-settling characteristics; establishing an upper column of liquid confined by substantially vertical boundaries extending upward from a locality spaced directly above the lower column, said upper column having a cross-section at least as great as that of the lower column, said lower and upper columns communicating freely to the space between them, advancing solids-containing liquid upwards in said upper column by withdrawing liquid and particles therein of slowest-settling characteristics from an upper locality of said upper column, while permitting faster-settling particles to settle freely in said last-mentioned upwardly moving liquid in the upper column; maintaining a body of liquid surrounding said space between the columns and extending to a level substantially above said space, while introducing the aforesaid supply pulp into said liquid and thereby advancing the particles of said pulp laterally into the said intermediate space; and withdrawing, from a locality at the top of the lower column, a pulp of solids-containing liquid, said last-mentioned withdrawal including segregating solids-containing liquid at a laterally central region of said lower column and removing pulp from said region, to provide a discharge of particles of intermediate-settling characteristics while permitting fastest-settling particles to descend in the lower column adjacent the vertical boundaries thereof.

References Cited in the file of this patent

UNITED STATES PATENTS

| | | |
|---|---|---|
| 1,959,212 | Miller | May 15, 1934 |
| 2,708,517 | Evans | May 17, 1955 |
| 2,714,958 | Evans | Aug. 9, 1955 |

OTHER REFERENCES

Elements of Ore Dressing, Arthur F. Taggart, page 145, lines 33 to bottom of page, John Wiley and Sons, New York, 1951.